Patented Sept. 8, 1953

2,651,618

UNITED STATES PATENT OFFICE 2,651,618

STABILIZED TOUGHENED LATEX COMPOSITIONS

Alan Montague Hall and Ronald Woolman, Leicester, England, assignors to B. B. Chemical Co., Boston, Mass., a corporation of Massachusetts No Drawing. Application April 11, 1950, Serial No. 155,349. In Great Britain April 30, 1949

6 Claims. (Cl. 260—3)

1

This invention is concerned with improvements in or relating to latex compositions and particularly to compounded latex compositions for coating and impregnation.

Rubber latex finds application in coating and impregnating processes in which a workpiece is coated or impregnated with a composition comprising rubber latex and drying allowed to take place to deposit a coherent film or impregnation of rubber on or in the workpiece. Where rubber latex without additional compounding ingredients is used in such processes the deposited rubber frequently is not as tough as may be desired and also has little resistance to attack by mineral oils (especially where the latter are hot) and hydrocarbon solvents. It has been proposed, with a view to improving the toughness of rubber deposited from latex and its resistance to attack by mineral oils and hydrocarbon solvents, to incorporate in the latex fillers such as carbon black, clay or the like, but even by so doing results as satisfactory as may be desired are not readily obtainable.

It is a feature of the present invention to provide a rubber latex composition by use of which coatings or impregnations having improved toughness and resistance to attack by mineral oils and hydrocarbon solvents may be obtained.

In the patent applications filed by one of us, Alan Montague Hall, entitled Methods of Stabilizing Latex and Stabilized Latex Compositions, Serial No. 155,348, filed April 11, 1950, now Patent No. 2,610,216 of September 9, 1952, and Stabilization of Latex and Stabilized Compositions, Serial No. 155,347, filed April 11, 1950, now Patent No. 2,610,158 of September 9, 1952, there are disclosed stabilized latex compositions comprising an aqueous dispersion of rubber particles stabilized by association of the individual particles with a urea-casein material precipitated thereon as by addition of an excess of an aldehyde.

We have discovered that latex stabilized in accordance with the teachings of that application may be further improved by the addition to the latex of a resin or a cellulose ester or ether as a solution or dispersion comprising an organic solvent. Latices compounded with a cellulose derivative such as a cellulose ether or ester, or a resin such as a resinous condensation product of a phenol and an aldehyde, form coatings and impregnated products which are tougher and stronger than those from unmodified latices and which are substantially unaffected by the action of solvents including hot mineral oils and hydrocarbon solvents.

2

The stabilized latex for compounding with a resin or cellulose derivative solution or dispersion may be prepared by mixing together a latex or aqueous dispersion of a rubber with urea and casein either as a reaction product or as unreacted materials and precipitating the urea and casein material on the individual rubber particles of the latex, for example by addition of an excess of aldehyde. As explained more fully in the application entitled Methods of Stabilizing Latex and Stabilized Latex Compositions, a urea-casein reaction product may be prepared by reacting together at least one-half part and preferably from two to four parts by weight of casein with one part of urea in water solution. This reaction product may be added to a latex in the proportion of at least 1½ parts and preferably at least 4½ parts by weight to 100 parts by weight of rubber in the latex.

In accordance with procedure described in the application entitled Stabilization of Latex and Stabilized Compositions, a similar but perhaps not quite so effective result may be obtained by incorporating unreacted urea and casein in latex in the same relative proportions. The addition of unreacted urea and casein may be effected by adding urea and casein separately to the latex or by adding an unreacted solution comprising urea and casein to the latex.

Precipitation of the reacted or unreacted urea and casein on the rubber particles of the latex may be effected by adding a precipitating agent, preferably formaldehyde in excess of the amount required to react with ammonia present in the latex.

Resin or cellulose derivative solutions or dispersions for addition to the stabilized latex may be prepared by simple solution in suitable solvents, or by solution of the resin or cellulose derivative in a solvent followed by emulsifying the solution in an aqueous medium.

Resins which have been found particularly satisfactory for compounding with latex are the heat-curing B-stage phenol-aldehyde type. The word "phenol" is used herein to denote phenols generally, i. e. xylenols, cresols and the like, and not monohydroxy-benzene only. When a latex is compounded with a resin of this type and used for coating or impregnating a workpiece, the deposited composition may be heated to cure the resin to provide a coating or impregnation which is unusually resistant to attack by mineral oils or hydrocarbon solvents.

Suitable cellulose derivatives include ethyl cellulose, cellulose acetate, cellulose nitrate, cellulose acetate-butyrate and so on.

Resins and cellulose derivatives of these types are normally insoluble in non-polar hydrocarbon solvents, being soluble only in polar solvents or in solvents comprising a mixture of polar and non-polar solvents. Hence, to form a dispersion or solution of a resin or cellulose derivative of these types by dissolving the resin in a solvent, a polar solvent must be used, at least in part.

These polar solvent-containing solutions or dispersions of resin or cellulose derivatives are combined with the urea-casein stabilized latex in quantity sufficient to obtain the desired change in properties. Improvement in the properties of material deposited from the latex may be obtained upon addition of as little as 1 or 2% of solution or dispersion but no difficulty is met on addition of as much of the resin or cellulose derivative as may be desired since large quantities of resin dispersion may be added without causing flocculation or instability of this latex, a stable composition resulting although it has long been known that unstabilized latices are coagulated, either immediately or on standing a few hours, by even small additions of a like dispersion.

The new stable composition possesses heretofore unobtainable properties. Thus it possesses the fluidity and ease of application of a conventional uncompounded latex; but deposits a stronger, tougher, more solvent resistant material than has been possible with previously known latex compositions. The composition may be handled mechanically without trouble; and the material deposited from the composition possesses the normal adhesive characteristics of a conventional latex. Where a curing type resin is employed the material deposited by the latex may be brought by heating to a condition in which it is substantially unaffected by solvent.

The following examples are given to aid in understanding the invention. It is to be understood that the invention is not restricted to the specific reagents, proportions or procedures described therein:

*Example I.*—A resin dispersion was first prepared as follows: 85 gms. of Epok (registered trade-mark) Resin Solution J3781/60, which is understood to be a 60% solution in ethyl alcohol of a heat-curing B-stage cresol-formaldehyde resin, and is obtainable from British Resin Products Ltd., was added with stirring to the following solution:

Nitromul _____ gms.__ 6
Water _____ ccs.__ 42

Nitromul is a proprietary emulsifier obtainable from I. C. I. Ltd. and is the sodium salt of modified polyvinyl acetate-maleate. A uniform resin dispersion was produced.

124 gms. of urea, 241 gms. of casein were dissolved in 615 gms. of water and the solution was heated on a water bath to a temperature of 85° to 90°. The casein and urea appeared to react together on heating to form a reaction product and violent frothing took place due, apparently, to escape of gas. Heating was continued until no further frothing was observable. 10 ccs. of an 880 specific gravity ammonia were then added to the hot liquid which was then made up to 1040 gms. by addition of water and allowed to cool. The resulting solution had a solids content of about 35%.

16 gms. of the above solution were added to 200 gms. of a 60% rubber latex made alkaline with a little ammonia and the resultant mixture was thoroughly stirred. Aqueous formaldehyde was added in amount sufficient to leave excess formaldehyde after reacting with all the ammonia present. This point was reached when 17 gms. of a 40% formaldehyde solution, diluted with 23 ccs. of water had been added to the latex mixture. Apparently, the excess formaldehyde reacted with the urea-casein reaction product to cause precipitation upon the dispersed globules of the latex.

The resultant rubber latex composition was very slightly acid and had a solids content of about 50%.

The composition was allowed to stand for seven days at room temperature and was then mixed with the resin emulsion described above in the ratio of 200 gms. of the rubber latex composition to 133 gms. of the resin emulsion. There were also included in the mixture 2½ gms. of 50% Vulcafor DAU dispersion, 2½ gms. of a 50% Nonox S dispersion, 10 gms. of a 50% zinc oxide dispersion and 40 gms. of a 50% sulphur dispersion. Vulcafor DAU and Nonox S are respectively a thiuram polysulfide proprietary accelerator and a proprietary antioxidant composed of the condensation product of aldol-alpha and aldol-beta naphthylene obtainable from Imperial Chemical Industries, Ltd.

A field coil for a dynamo consisting of about 12 oz. of No. 20 SWG enameled copper wire was heated to about 100° C. and dipped in the above composition. The coil was removed from the composition, drained and baked at about 150° C. for 40 minutes. The baking step brought the rubber to vulcanized condition and cured the resin to form an impregnation within and a coating upon the coil which showed considerable toughness and which were substantially unaffected by hot mineral oils and hydrocarbon solvents.

*Example II.*—A 14% casein solution was prepared by soaking 17 gms. of casein for one-half hour in 85 ccs. of water, thereafter adding a solution consisting of 5 gms. of borax in 15 ccs. of water, and heating the resultant mixture to 150° F. to form a clear solution.

24.5 gms. of the above casein solution were mixed with 200 gms. of a 60% natural rubber latex. Thereafter a solution of urea comprising 1.8 gms. of urea in 9 ccs. of water was added to the latex-casein mixture and finally 17 ccs. of an aqueous 40% formaldehyde solution were added and thoroughly mixed with the other ingredients.

The resulting mixture, after standing at room temperature for seven days, was blended with a resin emulsion as set forth in Example I and formed a stable composition suitable for forming a tough solvent resistant coating.

*Example III.*—200 gms. of a 60% natural rubber latex were mixed with an aqueous solution comprising 1.8 gms. of urea in 9 ccs. of water. There were then added 24.5 gms. of a 14% casein solution prepared as described in Example II. Finally there were added 17 ccs. of a 40% aqueous formaldehyde solution. The resultant mixture after standing for seven days was combined with a resin emulsion as set forth in Example I. The resulting composition possessed excellent stability and the ability to form tough solvent resistant coatings.

*Example IV.*—18 gms. of casein were soaked in 80 ccs. of water for one-half hour. 2.5 ccs. of concentrated aqueous ammonia were then added and the resultant mixture heated to 150° F. to form a clear solution.

An aqueous solution of the urea comprising 9 gms. of urea in 20 ccs. of water was then added to the casein solution.

26.5 gms. of the casein-urea solution prepared as described above were then mixed with 200 gms. of a 60% natural rubber latex and thereafter there was added a solution of formaldehyde prepared by mixing 17 ccs. of a 40% aqueous formaldehyde solution with 8 ccs. of water. The mixture of natural rubber latex, casein-urea solution and formaldehyde solution after standing at room temperature for seven days was combined with a resin solution as described in Example I. The resultant latex composition possessed excellent stability. A film of rubber and resin solids deposited from the latex composition possessed excellent toughness and resistance to solvent when cured at 150° F. for 40 minutes.

Having described our invention, what we claim as new and desire to secure by Letters Patent of the United States is:

1. A latex composition comprising a mixture of a liquid dispersion of a rubber toughening agent from the group consisting of phenol aldehyde resins, cellulose esters and cellulose ethers, said dispersion containing a polar organic solvent and an aqueous dispersion wherein the dispersed phase comprises natural rubber individual particles of which have precipitated thereon a casein-urea material comprising at least one-half part by weight of casein to one part by weight of urea together with formaldehyde, at least 1½ parts combined weight of casein and urea being associated with 100 parts by weight of rubber solids in said dispersion.

2. A latex composition comprising a mixture of a liquid dispersion of a thermosetting phenol aldehyde resin containing a polar organic solvent and an aqueous dispersion wherein the dispersed phase comprises natural rubber the individual particles of which have precipitated thereon the product of combining from two to four parts by weight of casein with one part by weight of urea together with formaldehyde, 4½ parts combined weight of casein and urea being associated with 100 parts by weight of rubber solids in said dispersion.

3. A latex composition comprising the mixture of a liquid dispersion of a thermosetting phenol aldehyde resin containing a polar organic solvent and an aqueous dispersion wherein the dispersed phase comprises natural rubber the individual particles of which have precipitated thereon by formaldehyde, the reaction product of two to four parts by weight of casein with one part by weight of urea, 4½ parts combined weight of casein and urea being associated with 100 parts by weight of rubber solids in said dispersion.

4. A latex composition comprising the mixture of a liquid dispersion of a cellulose ester containing a polar organic solvent and an aqueous dispersion wherein the dispersed phase comprises natural rubber the individual particles of which have precipitated thereon the product of combining from two to four parts by weight of casein with one part by weight of urea together with formaldehyde, 4½ parts combined weight of casein and urea being associated with 100 parts by weight of rubber solids in said dispersion.

5. A latex composition comprising the mixture of a liquid dispersion of a cellulose ester containing a polar organic solvent and an aqueous dispersion wherein the dispersed phase comprises natural rubber the individual particles of which have precipitated thereon by formaldehyde, the reaction product of two to four parts by weight of casein with one part by weight of urea, 4½ parts combined weight of casein and urea being associated with 100 parts by weight of rubber solids in said dispersion.

6. A latex composition comprising a mixture of a liquid dispersion of a rubber additive containing a polar organic solvent and an aqueous dispersion wherein the dispersed phase comprises natural rubber, individual particles of which have precipitated thereon a casein-urea-formaldehyde material comprising at least one-half part by weight of casein to one part by weight of urea.

ALAN MONTAGUE HALL.
RONALD WOOLMAN.

References Cited in the file of this patent
UNITED STATES PATENTS

| Number | Name | Date |
|---|---|---|
| 1,967,639 | Wedger | July 24, 1934 |
| 1,971,522 | Dunham | Aug. 28, 1934 |
| 2,417,975 | Ebers | Mar. 25, 1947 |
| 2,433,656 | Egan et al. | Dec. 30, 1947 |